United States Patent [19]
Litten

[11] Patent Number: 5,829,947
[45] Date of Patent: Nov. 3, 1998

[54] CARGO HANDLING HYDRAULIC RAMP LOADER SYSTEM AND METHODS

[75] Inventor: Glen L. Litten, Springfield, Oreg.

[73] Assignee: Emerald Rail Technologies, LLC, Springfield, Oreg.

[21] Appl. No.: 665,201

[22] Filed: Jun. 13, 1996

[51] Int. Cl.⁶ ........................................................ B60P 1/44
[52] U.S. Cl. ........................... 414/537; 414/540; 414/539; 414/546; 14/71.3
[58] Field of Search ...................................... 414/399, 390, 414/391, 392, 537, 538, 498, 499, 557, 500, 545, 539, 559, 540, 546, 556; 14/69.5, 71.1, 71.3, 71.7, 72.5; 254/2 R, 2 C

[56] References Cited

U.S. PATENT DOCUMENTS

| | | | |
|---|---|---|---|
| 2,424,862 | 7/1947 | Stuart | 414/537 |
| 2,591,153 | 4/1952 | Hodges | 414/537 X |
| 3,116,844 | 1/1964 | Blunden et al. | 414/537 |
| 4,455,119 | 6/1984 | Smith | 414/537 |
| 5,171,123 | 12/1992 | Nogts et al. | 414/540 |

FOREIGN PATENT DOCUMENTS

| | | | |
|---|---|---|---|
| 809049 | 3/1969 | Canada | 414/540 |
| 1376467 | 9/1964 | France | 414/537 |
| 2455227 | 5/1976 | Germany | 414/540 |
| 127703 | 5/1964 | Japan | 414/537 |
| 8104788 | 5/1982 | Netherlands | 414/540 |
| 888476 | 1/1962 | United Kingdom | 410/226 |

*Primary Examiner*—Frank E. Werner
*Attorney, Agent, or Firm*—Klarquist Sparkman Campbell Leigh & Whinston

[57] ABSTRACT

A hydraulic ramp loader, track channel systems and methods for lifting, leveling, aligning, moving loading and unloading cargo on channel-dolly-pallets into a carrier equipped with a like track channel system, the ramp loader having a lifting hydraulic cylinder, a leveling hydraulic cylinder, a control means and an extendible and expandable interlocking track channel frame ramp.

12 Claims, 11 Drawing Sheets

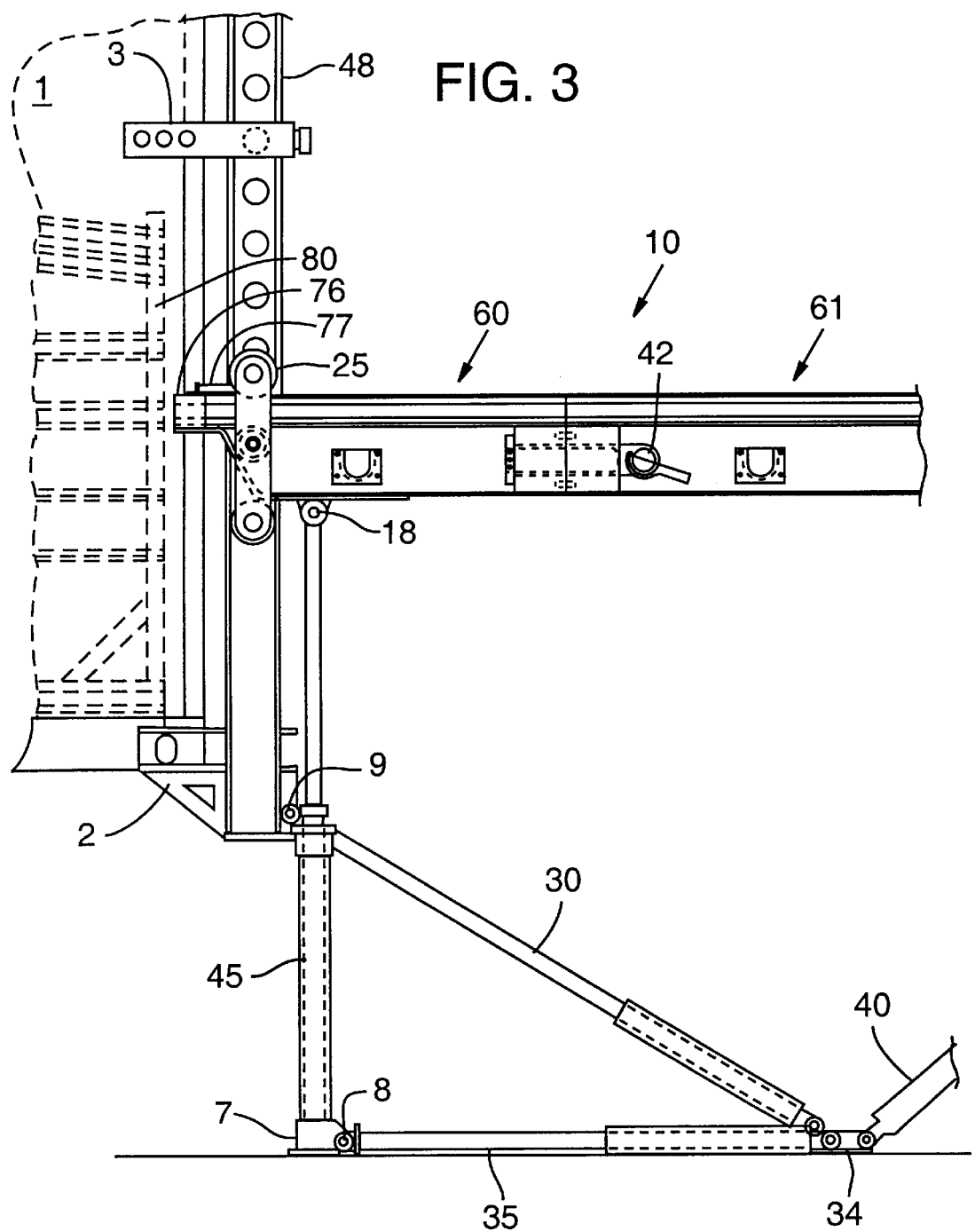

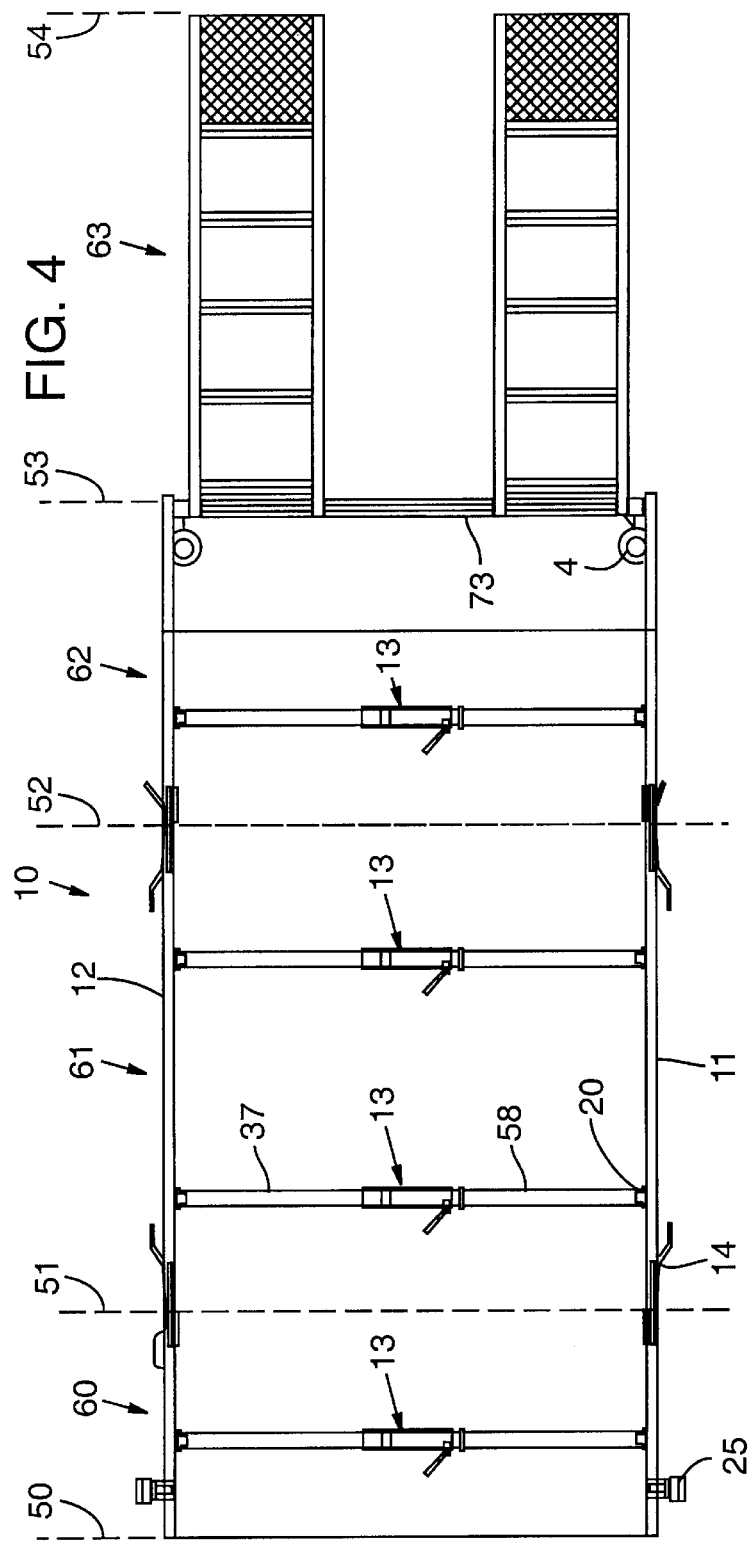
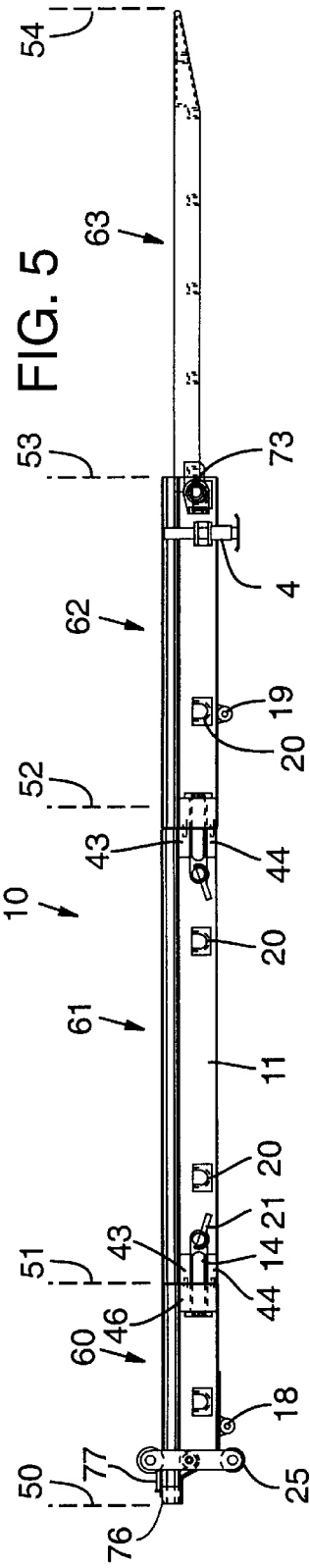

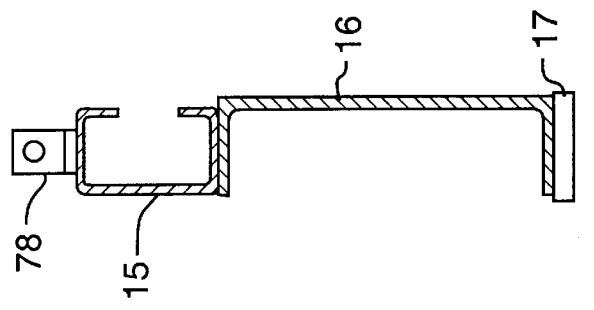
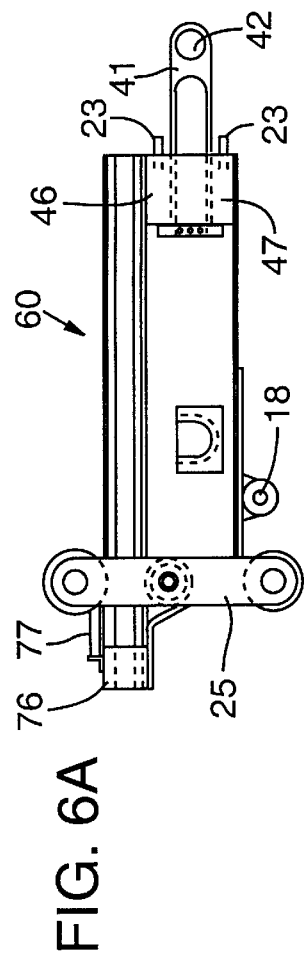
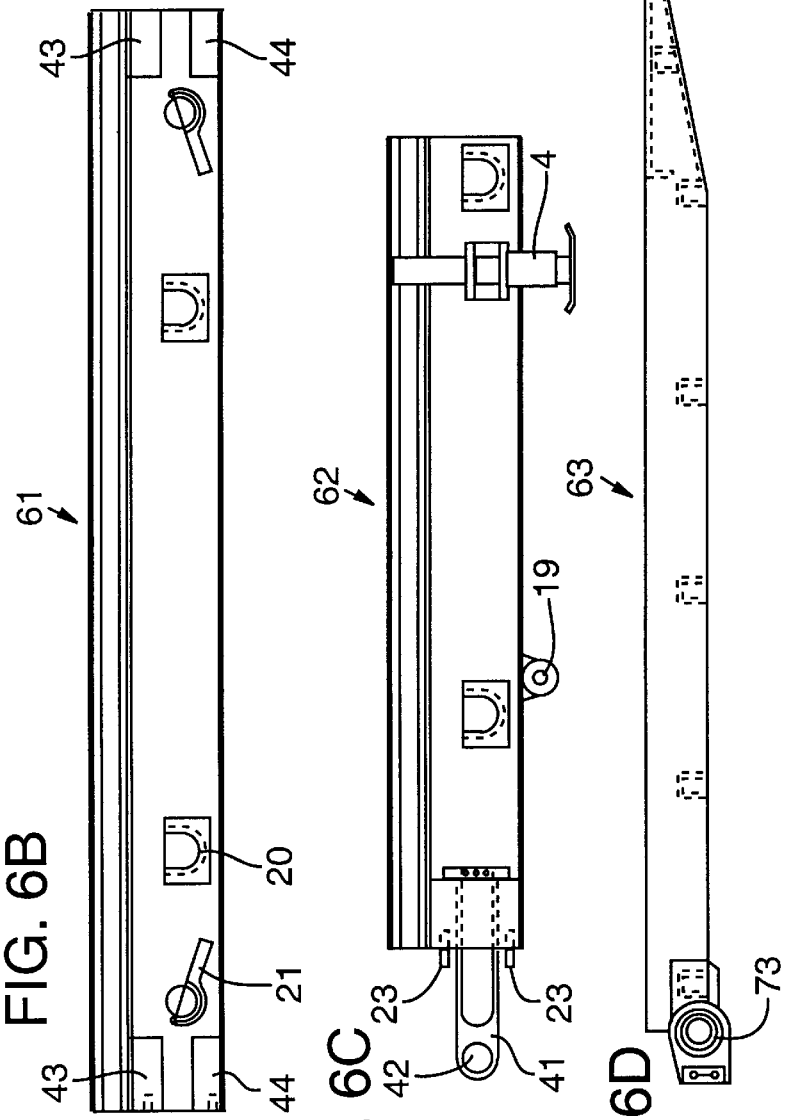

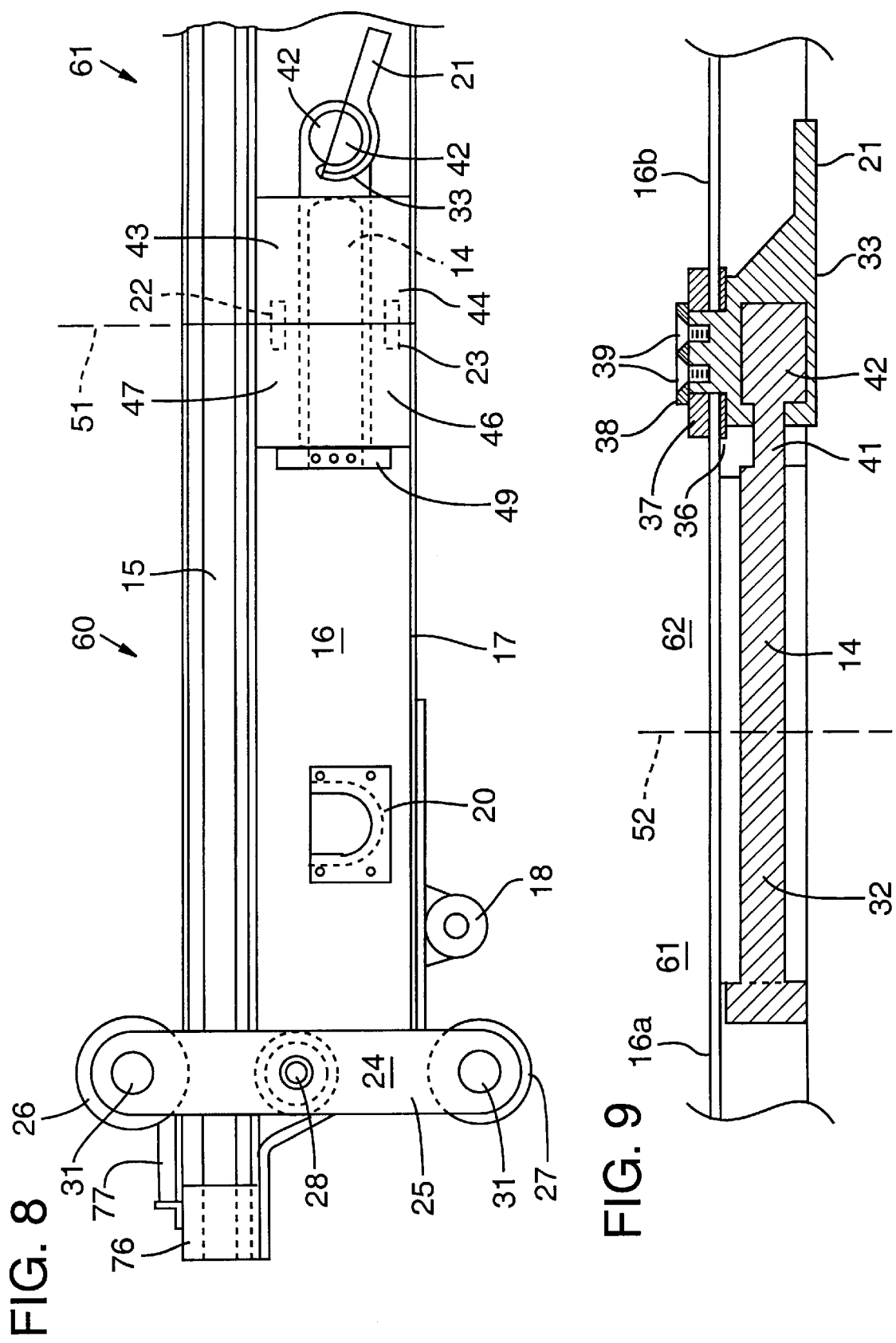

CARGO HANDLING HYDRAULIC RAMP LOADER SYSTEM AND METHODS

FIELD OF THE INVENTION

The invention relates to automated hydraulic ramp loaders and methods for lifting, leveling, inclining, aligning, loading and unloading cargo from carriers fitted with rail systems such as shipping containers, tractor trailer vans, rail cars, and vehicle transporters.

BACKGROUND OF THE INVENTION

Transportation networks for distribution of consumer goods are rapidly changing to eliminate wholesalers and accommodate a more decentralized retail distribution in warehouse outlets, malls, factory-outlets, and catalogue sales and a variety of "mega"-stores. With such a large proportion of consumer goods now being transported direct from the manufacturer to consumer outlets special problems have arisen in transport and handling of heavy and/or bulky cargoes at these destinations. While loading docks and forklifts are common in a wholesale setting, they are frequently not available at retail outlets. Also, conventional delivery trucks equipped with hydraulic lift-gates are severely limited in the size and weight of cargo that can be accommodated. In many retail settings it is nearly impossible for a single individual to load and unload heavy or bulky loads from a tractor trailer or cargo container without renting special equipment or hiring movers. If an item must be returned to a manufacturer the problems are compounded. One class of heavy bulky cargo is represented by vehicles such as automobiles and trucks.

In 1994 approximately 70% of all new vehicles (i.e., 12.5 million) were moved by rail and the remainder by road. During transport in multilevel rail cars and truck carriers many vehicles sustained paint and structural damage, for example during driving on and off the cargo carriers or as doors were opened into the sides of rail cars. Because drivers must enter and exit vehicles while they are parked in carriers, vehicle transporters must also be overly wide, resulting in wasted space, added weight and higher operating costs.

Recently, interest has emerged in developing systems to move vehicular cargoes without relying on drive-on/drive-off loading. Attempts have been made to automate loading by using e.g. a wheeled pallet that slides on rails (U.S. Pat. Nos. 4,759,688; 3,498,480; 3,110,466 and 3,221,907); vehicles inserted into a "sleeve" structure (U.S. Pat. No. 4,919,582); and, a rolling "dolly" that engages wheels in the cargo vehicle (U.S. Pat. No. 4,049,025). These attempted solutions have created other problems. Loading "systems" generally rely upon special units that are only available at a manufacturing plant or distribution center, e.g., a pivoting loading platform as disclosed in U.S. Pat. No. 3,498,480. Such expensive loaders can frequently require more than one operator and are generally unsuitable for operation at a retail outlet. In the case of vehicular cargo, once the loaded carriers are out of the distribution centers the "loading systems" frequently revert to reliance on a drive on/drive-off operation.

Thus, one object of the invention is to provide a cargo handling system with loading ramps for cargo transporters, tractor trailer vans, cargo containers and rail cars. It is another object to provide a ramp that is capable of lifting, leveling, loading and aligning cargo on a track channel system with a channel track racking system in a carrier. It is yet another object to provide a ramp capable of handling heavy cargo in a manner that allows loading and unloading by a single operator at e.g., a retail site. It is still another object to provide a general purpose strong lightweight hydraulic lifting, leveling and aligning ramp that can be assembled by a single individual from pieces in less than about half an hour. It is yet another object to provide a device for moving cargo along a track channel system so that a single operator can move thousands of pounds of cargo on rolling pallets into and out of carriers. A final object of the invention is to provide a method for loading and unloading cargo using rolling pallets, a channel track racking system, a track channel tug and a lifting, leveling, aligning and inclining hydraulic ramp loader.

SUMMARY OF THE INVENTION

A track channel system with rolling dolly pallets, a hydraulic ramp loader, a track channel tug and cargo handling methods are disclosed. The system is generally useful and is particularly helpful for moving and loading heavy and/or bulky cargo that would normally require several movers, a forklift and/or a hydraulic lift gate. The hydraulic ramp loader system disclosed herein allows a single individual to lift, level, align, load and unload cargo from a track channel system on a ramp into a track channel racking system in a carrier. The ramp loader system allows a single individual to handle heavy and bulky cargoes weighing many thousands of pounds, (e.g. vehicles weighing up to 8000 lb.), and to maneuver the loaded ramp to within tenths of an inch so that the track channels of the ramp are aligned with the track channels in the carrier. The ramp loader has a hydraulic lifting and leveling cylinders, is extendible in length to about 26 feet; and is expandable in width from about 6 feet to about 9 feet. The ramp loader has inter-engaging subassembly components each weighing less than about 75 lb. that can be assembled into a ramp by a single operator in a short period of time (e.g., about half an hour). The cargo handling system includes a hydraulic track channel "crawler" tug that is capable of pulling or pushing heavy cargo along channels from a warehouse and loading dock onto the ramp loader and into carriers. Warehousing and loading dock cargo handling methods using track channel systems are also disclosed.

BRIEF DESCRIPTION OF THE DRAWINGS

FIG. 3 depicts a partial side view of the front sections of the track channel ramp loader of FIGS. 1 and 2 with hydraulic lifting and leveling cylinders pressurized to lift the ramp several feet off the ground; about level with the rear deck of a carrier; and with alignment between the track channels of the ramp and the channel tracks installed on the interior of the carrier.

FIG. 4 depicts a plan view of the track channel ramp loader of FIGS. 1–3, as disclosed further below.

FIG. 5 depicts a side view of the track channel ramp loader of FIG. 4.

FIG. 6 depicts side views of the individual subassembly components of the ramp of FIGS. 4 and 5, as follows:

FIG. 6A depicts a neck subassembly; FIGS. 6B and 6C depict two separate span bridge subassemblies; and FIG. 6D depicts a lower-ramp subassembly.

FIG. 7 depicts in a partial cross-sectional view a track channel frame member.

FIG. 8 depicts a partial side view of the neck subassembly of FIG. 6A.

FIG. 9 depicts a portional plan cutaway view of a slide lock assembly for fastening together the subassemblies of FIGS. 6A–6D, above. The juncture of two subassemblies is indicated in the figure by the dashed vertical line.

DETAILED DESCRIPTION OF THE PREFERRED EMBODIMENTS

Figure 1:
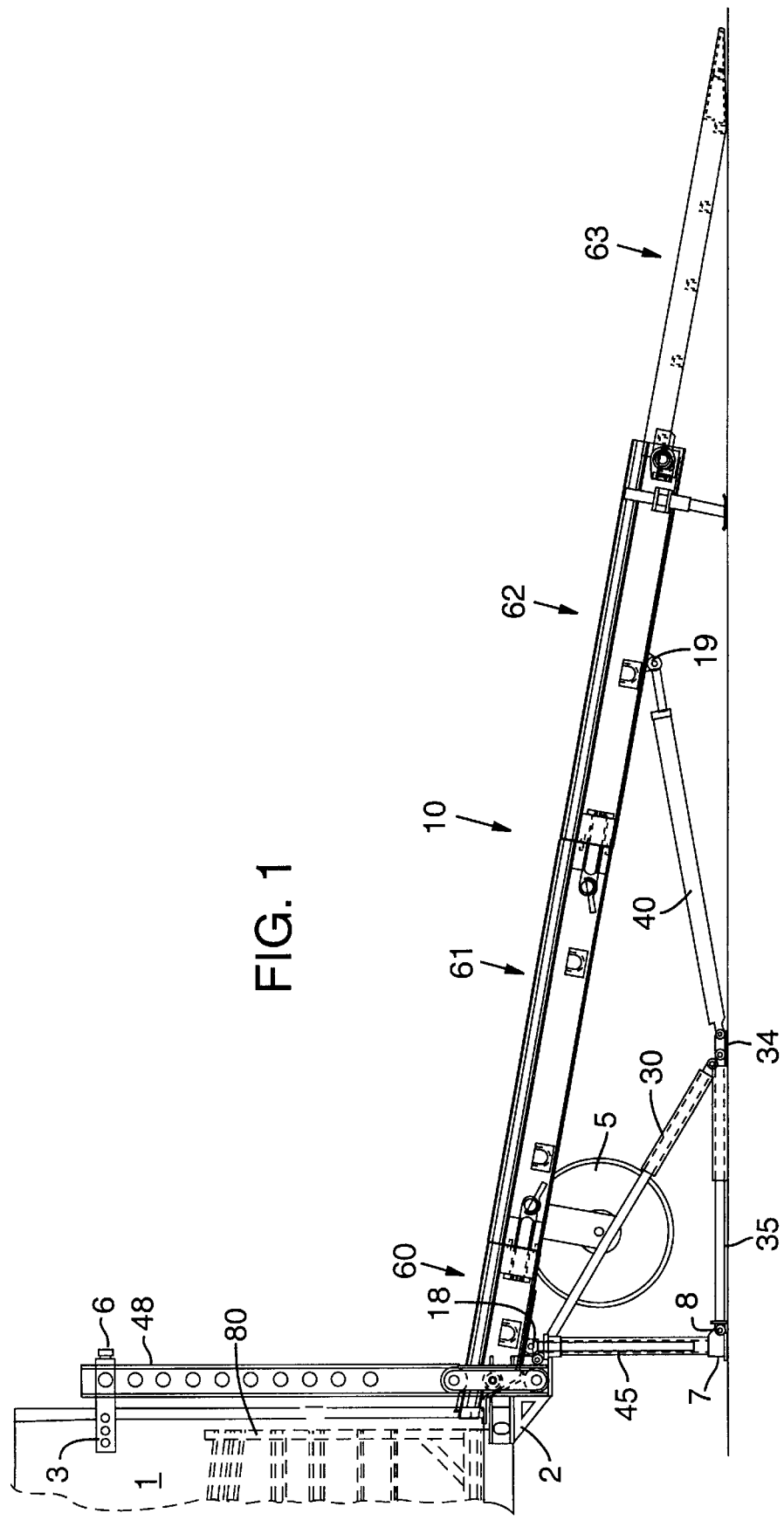
FIG. 1 depicts a side view of ramp loader mounted on the rear of a truck van trailer carrier.

Embodiments of the invention provide systems for rapidly loading and unloading heavy cargo with a minimum of effort from a variety of different carriers, including shipping containers, truck tractor trailers and vans, rail cars, automobile and truck transport carriers, and the like. According to methods of the invention a cargo is loaded onto a channel-dolly pallet that has wheels capable of engaging a track channel system (e.g., as depicted schematically in FIG. 15 and as disclosed further below). In one aspect, the track channel system is a component of a distribution warehouse conveyor-type system. In another aspect, the track channel system is a component of a loading dock racking system for storing the cargo in anticipation of loading onto or into a carrier. In yet another aspect, the track channel system is a component of a hydraulic ramp loader system disclosed further below. In still another aspect, the track channel system is a component of a racking system installed into or onto a carrier for receiving dolly pallets having heavy cargo. It is an aim of the invention to provide a continuous loading system wherein a heavy or bulky cargo is loaded onto a dolly pallet in a warehouse; moved (i.e., by rolling the pallets) to a loading dock racking system; moved onto the instant track channel ramp loader (i.e., by rolling); moved into a carrier fitted with a track channel system by first lifting, leveling and aligning the ramp track channels with the track channels in the carrier, and then rolling the cargo dolly-pallet into the carrier. Other aspects of the invention provide a relatively lightweight hydraulic "crawler"-tug with wheels that engage the interior of a track channel. The instant "crawler"-tug is capable of pulling or pushing heavy cargo along the subject track channels at speeds of up to several feet per second. The track channel tug is lightweight and can be rapidly placed into position or removed from the track channel system by a single operator.

In the following disclosure, terms will first be defined followed by disclosure of aspects of the hydraulic track channel ramp loader; then aspects of the track channel "crawler"-tug; and, then cargo handling methods of the invention.

The terms used herein are intended to have the meanings, as follows: namely, "Carrier" is used interchangeably with "transporter" to mean a movable container capable of transporting heavy cargo on its surface or in its interior. Representative examples of "carriers" include flat bed trucks and tractor trailer vans, rail cars, cargo shipping containers, ships, aircraft and the like. In presently preferred embodiments, the ramp loader of the instant invention is reversibly affixed to a cargo carrier that is equipped with a narrow gauge track channel assembly for receiving cargo that is supported on a rolling dolly, e.g., an aircraft cargo bay or a truck trailer van equipped with a track channel assembly.

"Cargo" is intended to mean a mass that may be carried on or in a carrier. Representative examples of cargo include: crates loaded e.g. with farm produce; bins loaded e.g. with metal ore; boxes and pallets loaded e.g. with consumer goods; rail car cushion devices; automobile and truck axle assemblies; and the like. Vehicles are another representative example of a cargo.

"Multilevel trailer" is used interchangeably herein with "multitier trailer" to mean that the subject trailer is equipped with a track channel racking system that is capable of receiving cargo on rolling pallets. In one representative example, a rail car is fitted with a channel track system capable of receiving two or more rows of vehicles or cargo, i.e., one arranged vertically above the other; or, one arranged horizontally next to another.

"Drive system" is intended to mean a dolly-pallet drive-means allowing a person to move vehicles in and out of a cargo carrier onto the subject ramp loader without relying on the motor of the vehicle or of the motor of cargo carrier for motive force. Representative "drive systems" fitted on the subject ramp loader of the invention include hydraulic rams, electric cable winches, chain-cog systems, gears engaging teeth in track channels, and the like; as well as gravity-assisted motive force, e.g., an inclined ramp. A presently preferred embodiment of a drive system is provided by the instant track channel "crawler" tug disclosed further herein below.

"Ramp loader" is intended to mean the embodiments of the invention that when functioning are capable of lifting, leveling, aligning and inclining cargo for loading into and unloading from cargo carriers fitted with track channel systems. The subject ramp loader may be stored or carried on or in a cargo carrier and in one embodiment the loading and lifting functions are conducted with the instant ramp loader deployed from the rear deck (or side) of a cargo carrier. In another embodiment, the subject ramp loader is fitted with wheels and finds uses in warehouse and loading docks for moving cargo on track channel systems (as disclosed further below).

"Vehicle" is intended to mean automobile, truck, recreational vehicle, camping trailer, and the like.

Figure 15:
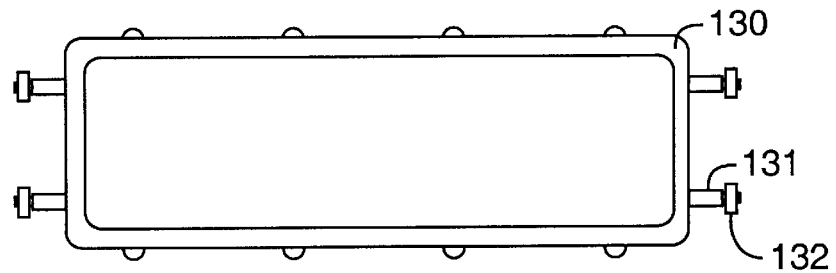
FIG. 15 depicts a channel-dolly-pallet according to the methods of the invention.

"Dolly" is intended to refer to a platform cargo carrier assembly mounted on fixed or swivel casters. Vehicles are commonly driven onto the dolly and secured to the dolly with straps. A representative example of a dolly is schematically depicted in FIG. 15 (as disclosed further below.)

A "pallet" describes a platform upon which cargo is loaded and shipped, and typically relates to a platform that permits a forklift to handle cargo without damaging the cargo. In the context of the invention, a dolly-pallet assembly is intended to mean a linked group of dollies that are capable of supporting an entire cargo load, e.g., a vehicle supported by 2 dollies- one for the front pair of wheels and one for the rear pair of wheels, and which is movable by virtue of having wheels or casters. In one representative example, two dolly-pallet assemblies are joined the one to the other e.g,, through linking bars to form the subject dolly-pallet assembly. In another representative example, the cargo load is a vehicle; each dolly independently supports two of the wheels of the vehicle; and the link between the dollies is provided by the vehicle. Accommodation of different cargo with different configurations of dolly-pallet assemblies and ramp loader track channel assemblies are of course considered to fall within the spirit and scope of the instant invention, provided that the dolly have rollers, wheels, and the like that are capable of engaging and guiding a cargo along a track channel e.g. into a carrier fitted with a track channel system.

"Channel-dolly-pallet-rack system" abbreviated "CDPRS", is intended to mean a cargo carrier equipped with racks of track channels for receiving the wheels of a dolly-pallet assembly. Representative examples of CDPRS carriers include rear loading and side loading rail cars, truck vans and the like.

"Track channel system" is used interchangeably with "track channel assembly" to mean two or more channels capable of supporting and guiding the wheels of a dolly (supra). In one representative example, a track channel system is fastened to the walls of a cargo carrier. In another example, the subject 2 or more track channel assemblies are arranged in vertical of horizontal rows forming a racking system for holding multiple dollies loaded with cargo. Each track channel is of sufficient individual width and fabricated of material of sufficient strength to receive, support and retain the wheels or casters of the dolly-pallet assembly when it is loaded with a cargo (e.g., a vehicle) and positioned on the ramp loader or within the carrier. In one presently preferred embodiment of a track channel system, the distance between the two (or more) track channels is adjustable through the use of horizontally extendible crossbraces (disclosed further below.) The instant ramp loader is preferably configured (i.e., size, shape, width between track channels) to be alignable with a track channel assembly located at a warehouse or in a cargo carrier so that dolly wheels pass freely from a warehouse racking system to the instant ramp loader and (when aligned) from the ramp loader to a track channel system in a cargo carrier. A representative, and presently preferred, track channel is of an aluminum alloy having a width of about 2 inches, an internal track channel height of about $2\frac{5}{8}$ inch that is capable of receiving and retaining dolly wheels having a diameter of about $2\frac{3}{8}$ inches, and has side walls that are about $\frac{3}{16}$ inch to about $\frac{1}{4}$ inch thick.

"Tire track assembly" is intended to mean two or more tire tracks installed on the subject ramp loader and placed at an appropriate distance for receiving the wheels of a vehicle. Each tire track assembly is of sufficient individual width and made of material that has sufficient strength to receive, support and retain the tires of a vehicle when the vehicle is driven onto the subject ramp loader.

Hydraulic Track Channel Ramp Loader

Embodiments of the invention provide hydraulic ramp loaders that lift, level, align, incline, load and unload heavy cargo into a variety of different types of carriers, e.g., rail cars, tractor trailers, cargo containers and the like. The presently preferred ramp loaders have widespread utility for moving heavy and bulky cargoes, e.g., cargoes having a weight of up to 8000 lb. and dimensions of up to 26 feet in length by about 9 feet in width and up to about 9 feet in height. The instant track channel ramp is capable of lifting, leveling and aligning a rack channel on the ramp with a track channel in a carrier to within tenths of an inch. In a lowered position, from the back of the carrier to the ground the ramp forms an inclined plane having an angle of less than about 11 degrees with the ground, preferably between about 8 and about 10 degrees.

Figure 2:
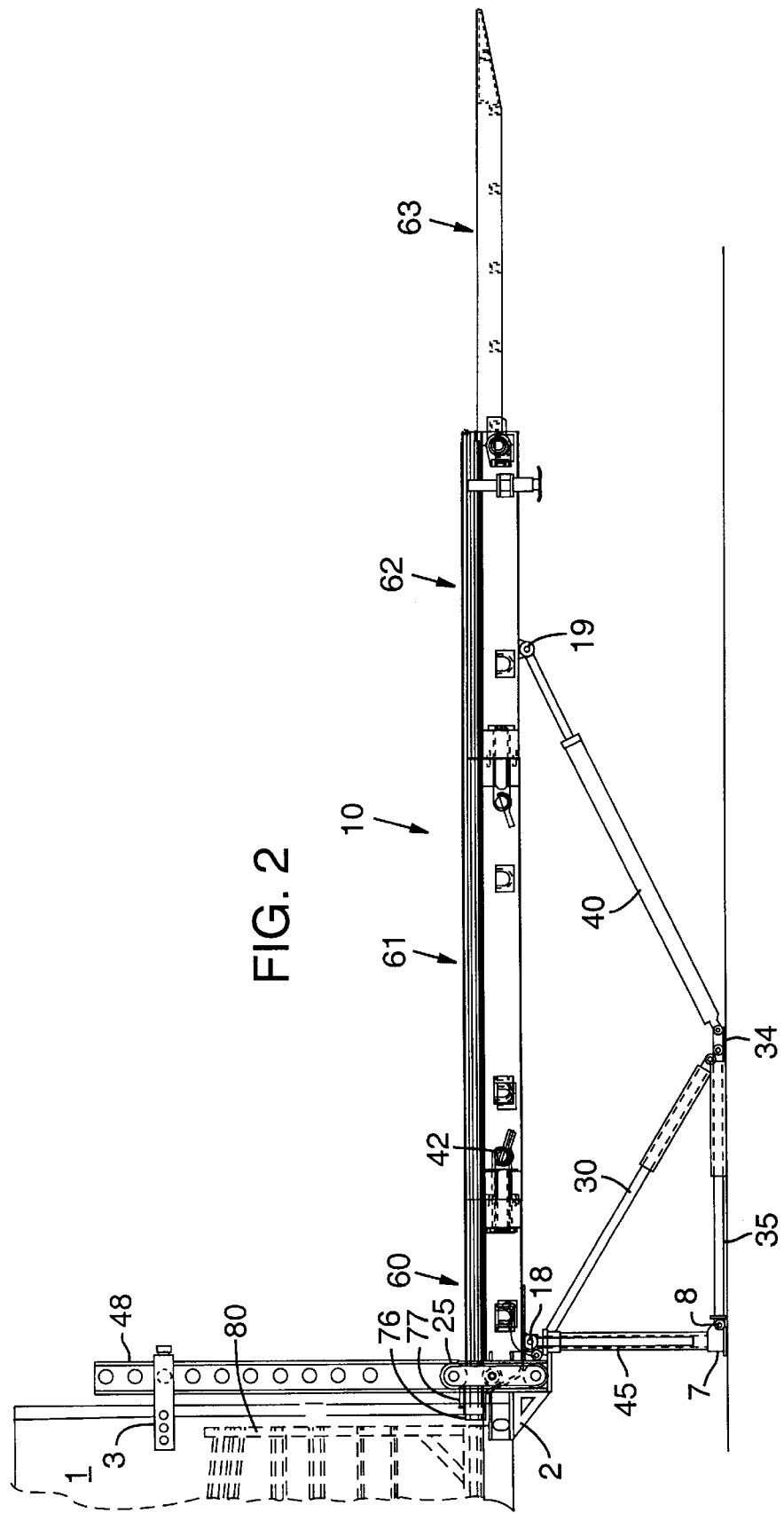
FIG. 2 depicts a side view of the ramp loader of FIG. 1 with the lifting and leveling cylinder pressurized to lift and level the ramp about level with the rear deck of a carrier.

Embodiments of the invention provide hydraulic ramp loaders whose representative construction and designs are detailed below. Referring to FIGS. 1, 2 and 3 depicting the ramp loader of the invention in two different operating positions deployed from the rear of cargo carrier 1. The ramp loader includes the following subassemblies and components: namely, extendible and expandable ramp 10 (FIGS. 1–3); track channel 15 and frame 16 (FIGS. 7–8, below); spring 77-loaded track channel alignment sleeve 76; extendible crossbraces 13 (FIGS. 4 and 10, below); support braces 30,35 and ground support brace pads 4 and 34; lifting cylinders 45; leveling cylinders 40; hose reel 5 (for hydraulic hoses); and mounting hardware including guide track 48, scissor bracket 3, mounting plate 2 (FIGS. 1–3).

Ramp loader 10 is fastened to the cargo carrier 1 through two guide tracks 48 one being fastened to each side wall of a cargo bay opening with a mounting plate 2 and a scissor bracket 3. Scissor bracket 3 slidably engages on guide track 48 and has scissor-means for engaging a structural member of the cargo carrier, e.g., the side wall of a trailer van or rail car frame. The subject bracket 3 is fitted with a first thumb screw that engages guide track 48 to fix the bracket in position, and a second thumb screw that engages the scissor-means to fix the bracket onto the cargo carrier. Mounting plate 2 is fixed to the edge of a cargo carrier, preferably with a cargo container twist lock fitting that engages a socket mounted on cargo carrier 1. The subject mounting plate preferably extends around a corner of carrier 1, i.e., to laterally support guide track 48, and contains a mounting flange 9 for strut 30 (below).

Struts 35,30 are pivotally and removably fastened (e.g., with clevis pins) to mounting flanges 8,9 and brace pad 34. Hydraulic lifting 45 and leveling 40 cylinders are likewise pivotally and removably fastened to ramp 10 at mounting flanges 18 and 19, respectively.

When attached to each side of a carrier 1 and assembled into the instant ramp loader 10, each side of ramp 10 has a triangular section formed by struts 30,35 and lifting cylinder 45. The subject triangular section provides a stable support for brace pad 34 against which hydraulic leveling cylinder 40 applies force when it is actuated to level ramp 10. In certain optional embodiments, struts may extend horizontally from the base of each lift cylinder 45 to engage on special wheel chocks that are trapped behind the rear wheels of a trailer van carrier 1.

Extendible and expandable ramp 10, as depicted in top plan and side views in FIGS. 4 and 5, respectively, is a preferred embodiment of the invention capable of lifting, leveling, inclining, loading and unloading a cargo carrier having a track channel assembly, e.g., an CDPRS cargo carrier (defined above). Ramp 10 does not have a continuous upper surface nor a welded or permanently affixed ramp deck. In certain embodiments, ramp 10 is configured with one or more removable tire grate assemblies (below). Referring to FIG. 4, ramp 10 track channel assembly is depicted prior to attaching two removable (optional) tire track grate (not depicted in FIG. 4). The subject track channel assembly of ramp 10 (FIG. 4) is made up of two track channel frames 11,12 that are expandably fastened in horizontal apposition by two or more expander crossbraces 13, i.e., four of which braces are depicted in FIG. 4. (Slidably extendible bar 73 is not a brace, but instead a mounting for lower ramp subassembly 64, as disclosed further below.) Expander crossbraces 13 are adjustable, conferring upon ramp 10 expandability of width for accommodating different widths (in the embodiment of FIGS. 1–3, about 6 feet to about 9 feet) of cargoes on different dolly-pallet assemblies. Different numbers and lengths of expander crossbraces 13 are of course possible for use in different embodiments of the invention, with the number and length selected being a matter of choice and at least partially dependent upon the desired load range and type of cargo to be handled. Ramp 10 (FIG. 1) is preferably stored and transported by cargo carrier 1, i.e., as subassembly components that can be reassembled when needed. Each of the individual subcomponent pieces of ramp 10 preferably weigh less than about 75 lb.

Ramp 10 is extendible in length through assembly of different numbers and sizes of inter-engaging subassembly panels. A side view of four representative subassembly panels is depicted in FIGS. 4,5 and FIGS. 6A–6D. In FIGS. 4–5 the four panels are identified, as follows: namely, line segments 50–51 (subassembly 60), 51–52 (subassembly 61), 52–53 (subassembly 62), and 53–54 (subassembly 63). The respective subassembly panels are locked together through multiple slide lock assemblies 14, four of which are depicted in FIG. 4. Subassembly panels 60, 61, 62, 63 are depicted in FIGS. 4, 5, and 6A–6D and lock assemblies 14 are described in greater detail in regard to FIGS. 8 and 9, below.

A presently preferred embodiment depicted in FIGS. 6A–6D has a ramp 10 that is extendible in overall length that is extendible from about 2½ feet, (i.e., subassembly 60 only), up to about 26 feet, (i.e., combinations of subassembly 60 with 61, 62, 63 and/or 64). The subject ramp 10 has an overall width that is expandable from about 6 feet to about 9 feet. Subassembly 60, also referred to as slide-bridge subassembly 60 (FIG. 6A), has a length of about 47 inches; subassemblies 61 and 62 (FIG. 6B and 6C, respectively), also referred to as span-bridge subassemblies, have a length of about 90 inches and about 70 inches respectively. Subassembly 64 (FIG. 6D), also referred to as the lower ramp subassembly, has a length of about 99 inches. Of course, in alternative embodiments the invention encompasses different numbers and sizes of ramp subassembly panels will be within the ordinary skill for matching weight, load and stress, and assembly preferences. It is also recognized that for different uses, a ramp loader assembly will comprise different numbers and sizes of subassembly components without departing from the spirit and scope of the present disclosure.

A cross-section of track channel frame 11,12 is depicted in FIG. 7, made up of track channel 15, support frame member 16 and strengthening tie-bar 17. Each track channel 15 is of a sufficient individual width and fabricated of material having sufficient strength to receive, support and retain the wheels of a dolly assembly when the dolly-pallet assembly is loaded with about 6000 to about 8000 pounds and rolled onto ramp 10. The following describes the dimensions of a representative track channel frame 11,12, and a presently preferred embodiment, that is capable of lifting, loading, leveling, inclining, loading and unloading cargoes of about 8000 lb. Track channel 15 is of an aluminum alloy having a wall thickness of about ³⁄₁₆ inch, having a channel width of about 2 inches, an exterior channel height of about 3 inches, and having an internal channel height of about 2⅝ inches that is capable of receiving dolly wheels having a diameter of about 2⅜ inches. Frame member 16 is of an aluminum alloy channel having a wall thickness of about ¼ inch, having a channel width of about 2 inches, and having a height of about 7¾ inches. Strengthening tie-bar 17 is of a solid aluminum alloy having ½ inch by 2 inch rectangular section (FIG. 7). In one embodiment channel frame 11,12 is of an aluminum alloy with track channel 15 being welded to frame member 16; which is in-turn welded to tie bar 17. In a presently preferred embodiment, frame 11,12 is extruded as a single unit with channel 15 having ³⁄₁₆ inch upper and lateral walls and a ¼ inch lower wall that is continuous with the upper portion of frame 16. Frame 16 has a wall thickness of ¼ inch. In the latter particular embodiment strengthening tie bar 17 may be optional.

In certain optional embodiments, track channel 15 may have cogs or teeth fitted on one of its track channel surfaces, i.e., capable of engaging teeth of a drive means; and/or, the track channel may have pilot holes drilled through its surface e.g. for insertion of a retaining pin to trap the dolly-pallet assembly at a specified location on ramp 10. In other optional embodiments, the components of the ramp loader 10 may be fabricated from other materials including formable steel, 50K steel, stainless steel, chrome-moly steel, and the like, but preferably provided that the weight of the individual ramp subassemblies does not exceed a weight that is easily carried and assembled by a single operator.

Referring now to FIG. 8, a partial interior side view of the right track channel frame assembly 11 depicts the relationships between the components previously depicted in views in FIGS. 3, 4 and 6A–6B. (In particular, as the components are assembled in subassemblies 60 and 61 of FIGS. 6A and 6B.) Track channel 15 is fastened (e.g., by welding) to the top surface of frame member 16. Cross-brace mounting bracket 20 is fastened (e.g., by through bolting or welding) to the lateral surface of frame member 16. Mounting flange 18, (that receives lifting cylinder 45, FIG. 1), is fastened to the lower surface of frame member 16 (e.g. by welding).

Also depicted in FIGS. 1, 3 and 8 is ramp pivoting roller assembly 24 that engages guide track 48 and provides means by which ramp 10 is fastened in a movable pivotal vertical orientation on cargo carrier 1. Pivoting roller assembly 24 is insertable and movable within guide track 48. Roller assembly 24 is made up of pivoting carriage 25 upon which are mounted axles for rollers 26,27 (FIG. 8). Carriage 25 is rotatably mounted on pivot axle 28 that is fastened to the interior surface of frame member 16. Rollers 26,27 and slide track channel 29 are rotatably mounted on separate axle shafts 31*a*, 31*b* that are fastened to carriage 25. In a presently preferred embodiment rollers 26,27 are about 5 inches in diameter, about 2¾ inch wide, with ball bearings. Each roller 26,27 is mounted on an axle shaft 31 that is about 2 inch in diameter that is fastened to carriage 25. Pivot axle 28 is preferably about 1¼ inches in diameter.

Guide means other than a pivoting roller carriage may be used in certain alternative embodiments for fixedly, movably, and pivotably attaching ramp loader 10 to carrier 1, including e.g, pivoting ramp 10 on toothed gears engaging teeth in guide track 48; a worm gear assembly in guide track 48 having a pivoting carriage assembly for attaching ramp 10; a geared chain-drive having a pivoting carriage assembly for attaching ramp 10; and, a hydraulic piston having a pivoting carriage assembly for attaching ramp 10.

In operation of a presently preferred embodiment, as ramp 10 is hydraulically lifted or lowered by cylinder 45, the pivoting roller carriage assembly 25 moves upwardly, or downwardly, respectively, in guide track 48. As ramp 10 is hydraulically leveled or inclined by cylinder 40, carriage 25 pivots on pivot axle 28. FIG. 8 also reveals details of channel slide lock assembly 14 alignment pins 22,23 and cam lock 21 that (in this preferred embodiment) reversibly fastens the slide bridge subassembly 60 to span bridge subassembly 61. Additional aspects of slide lock assembly 14 are more fully disclosed below in relation to FIG. 9, below.

FIGS. 8 and 9 depict aspects of slide lock assembly 14, in this particular case serving to fasten together slide-bridge subassembly 60 and span-bridge subassembly 61 (FIGS. 6A, 6B). The lock assembly 14 includes slide bar 32 that is slidably-mounted on the exterior surface of frame member 16a (FIG. 9), and is retained by raised boss portion 49 (FIG. 8) and by a raised longitudinal ridge that is milled into the center of the upper and lower edges of slide bar 32 and which engages upper and lower grooves cut into the longitudinal edges of receiving blocks 43, 44, 46, 47, as disclosed more fully below. In a preferred embodiment slide bar 32 is removable from the track channel frame 11,12 for storage.

Referring to FIG. 9, and examining aspects of the fastening together of subassembly panels, by fastening frame member 16b of subassembly 62 to the frame member 16a of subassembly 61. The locking slide bar 32 of panel 61 is capable of sliding into apposition with the cam lock assembly 33 in an adjacent panel 62. In panel 62 the cam lock assembly 33 is rotatably mounted through a hole in frame member 16b on cam lock sleeve 36. The cam lock sleeve 36 protrudes through the hole in frame member 16b and is retained by retaining washer 37 and backing plate 38. Backing plate 38 is reversibly fastened to sleeve 36, e.g., using flat head screws 39. In a presently preferred embodiment locking slide bar 32 has a constricted neck portion 41 and a raised lock portion 42. Neck portion 33 has a generally rectangular profile with a raised circular lock portion 42 and generally circular cam lock assemblies 33. Fastening subassembly panels together is achieved by sliding the raised lock portion 42 of the slide bar 32 (e.g., panel 61) into close apposition with the cam lock assembly 33 of the adjacent panel (e.g., panel 62) and rotating cam lock 33 onto the raised lock portion 42. For example, in the latter case, adjacent panels 61 and 62 are fastened by moving slide bar raised lock portion 42 from left to the right (FIGS. 8 and 9); into apposition with cam lock assembly 33; and then manually rotating handle 21 counterclockwise (FIG. 8) to engage the cam 33 on the lock portion 42. In operation, fastening the 4 subassembly panels 60–63 (FIGS. 6A–6D) together involves engaging four individual lock assemblies 14, i.e., one on each track channel 11,12 of each subassembly panel (FIG. 5).

In a presently most preferred embodiment, slide bar 32 is milled or formed (e.g., milled) from about 3 inch rectangular bar stock to have final dimensions of about 2 inches in width, 3½ inches in height and 12 inches in length with a circular raised lock portion 42 having a diameter of about 2½ inches. Cam lock assembly 33 has a diameter of about 3¾ inches with an offset (i.e., from the circular) of about 3/16 inch. Most preferably, a raised longitudinal dovetail ridge of about ½ inch in width and height is milled into the center of the upper and lower edges of slide bar 32. The latter upper and lower dovetail ridges are capable of engaging into upper and lower dovetail grooves, respectively, formed (e.g., milled) into the longitudinal edges of receiving blocks 46,47, as disclosed more fully below.

In other embodiments of the invention, the disclosed ramp locking-means find a variety of uses according to methods of the invention, e.g., for locking together components of track channel racking systems used in cargo carriers, in warehouses, and on loading docks (as disclosed more fully in regard to FIGS. 16A, 16B and 17, below.)

Ramp alignment pins 22,23 (FIGS. 6A–6D and 9) serve to insure proper vertical and horizontal positioning of the frame members 16a, 16b (and particularly track channels 15) as subassembly panels 60–63 are locked together. In a presently most preferred embodiment, the alignment pins 22,23 are of about ½ inch diameter. Alignment pins 22,23 are preferably mounted in alignment blocks 43,44, 46, 47 each of which blocks is fastened to frame member 16. The alignment pins 22,23 in blocks 46,47 of one subassembly panel (e.g., panel 60; FIG. 8) are capable of engaging blind holes in a alignment blocks 43,44 that are fastened to the frame member 16 of an adjacent subassembly panel (e.g., panel 61). By way of illustration, frame member 16 of panel 60 (FIG. 8) has alignment pins 22,23 that engage correspondingly aligned blind holes drilled into alignment blocks 43,44 that are in turn fastened to frame 16 of panel 61 (FIG. 8). In operation, the pins 22,23 serve to bring the adjacent subassembly panels into proper alignment as they are locked together, e.g., with slide bar/cam lock disclosed above.

In a presently preferred embodiment, alignment blocks 43, 44, 46, 47 mounted on ramp 10 also fulfills a function of slidably-retaining the locking slide-bar 32 on the outside surface of frame member 16 (above). Each alignment block 46,47 has milled into one longitudinal surface a dovetail groove for receiving one of the raised dovetail ridges milled into the upper and lower longitudinal edges of slide bar 32 (as disclosed above). In this particular preferred embodiment, engaging the two longitudinal ridges of slide bar 32 with the corresponding grooves milled into alignment blocks 43, 44, 46, 47 serves to "sandwich" slide bar 32 in a movable and ridable manner between blocks 46 and 47, and since blocks 46,47 are fastened to frame 16, slidebar 32 is slidably "sandwiched" and retained on frame 16.

In a presently most preferred embodiment, alignment blocks 43, 44, 46, 47 on ramp 10 are rectangular, of aluminum and with dimensions of about 6 inches long by 2½ inches deep by about 2 inch in width. Each block 46,47 has one blind hole drilled into its end surface that has a diameter of about ½ inch and a depth of about ¾ inch, i.e., the blind holes in blocks 43, 44, 46 or 47 are capable of receiving either pin 22 or pin 23, respectively.

In operation, the preferred embodiment subassembly panels 60–65 each weigh less than about 75 lb. and are assemblable into ramp 10 within about 30 minutes by a single operator. Engaging the slide lock assembly 14 between adjacent subassembly panels 60–64 provides a strong and secure ramp 10 that is capable of functioning in ramp loader 10 to lift, level, incline, load and unload cargoes of up to 8000 lb. mounted on dolly-pallet assemblies whose wheels roll within track channel 15.

Figure 10:
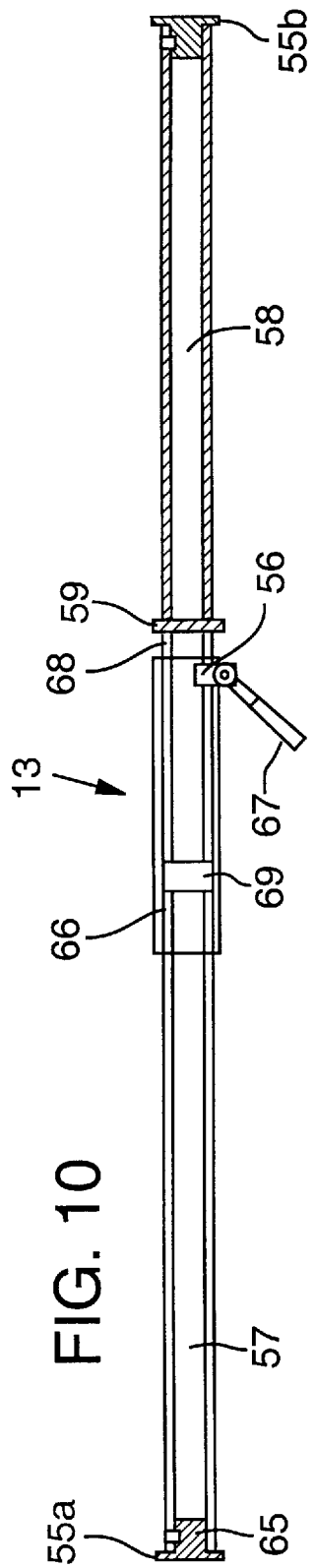
FIG. 10 depicts in a side cross-sectional view of a horizontal expander crossbrace.
Figure 11A:
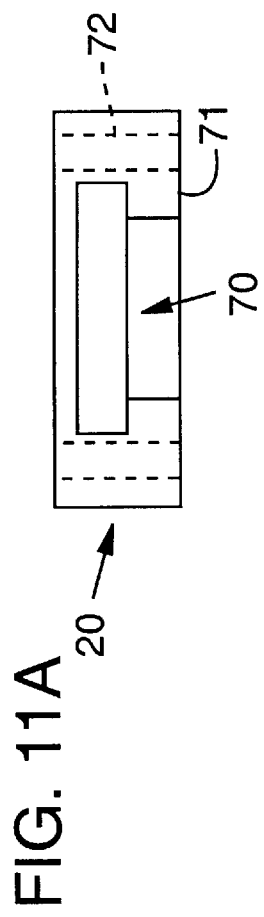
FIG. 11A depicts a partial cross-sectional plan view and FIG. 11B depicts the front view of mounting brackets that are fastened to track channel members (FIGS. 4 and 5) to accept and retain the horizontal expander crossbraces (FIG. 11.)
Figure 11B:
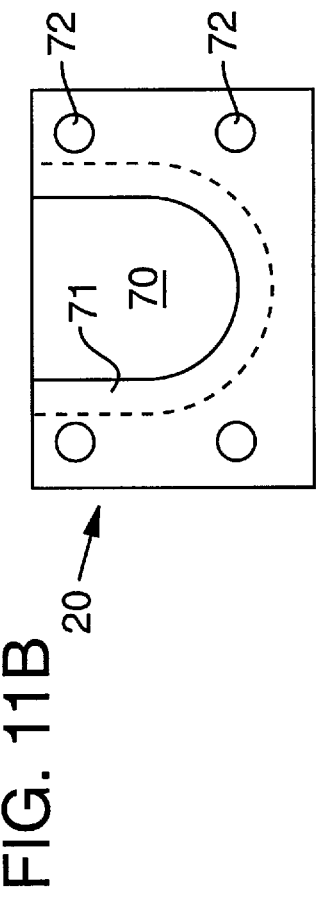

Ramp 10 is expandable from about 6 feet to about 9 feet in width by operating expander crossbraces 13 (FIG. 10). Crossbraces 13 are fastened to mounting brackets 20 (FIG. 10) on frame member 16, as disclosed further below. In the particular representative embodiment depicted in FIG. 11, tubular crossbraces 13 are manually expandable from a narrow width (e.g., about 6 feet) to a wider width (e.g., about 9 feet) by releasing all of the manual cam lock clamp assemblies 56 within in a particular subassembly 60–64; then pulling-apart track channel frames 11 and 12 to expand the ramp 10; and, then re-engaging the cam lock clamps 56 to fix the new wider width of the ramp.

Making reference to the illustrative embodiment depicted in FIG. 10, ramp expander crossbrace 13 has an end mounting flange 55 that is insertable into crossbrace mounting bracket 20 which is, in turn, fastened (e.g., bolted or welded) to frame member 16. End mounting flange 55*a* is preferably press fitted into the end of port tube 57 and retained in place, e.g., using a plug-weld 65. Port tube 57 has head piece 69 that is slidably movable within cam lock assembly 56 and retained therein, e.g., through use of a detent-plug-weld 66. Cam lock assembly 56 has a manually-operated handle 67 that actuates the clamp, and a collar member 68 with flange 59 to which is mounted (in a non-slidable manner) starboard tube 58 with its end mounting flange 55*b*.

In certain alternative embodiments, it may prove advantageous to use other types and shapes of crossbraces. For example, in certain embodiments ramp crossbraces and means for expanding the width of the ramp 10 may include screw jacks, hydraulic rams, and the like, having a variety of different locking means and a variety of different modular sections including at least tubular, rectangular and square cross-sections.

In a presently preferred embodiment, port tube 57 and starboard tube 58 of ramp 10 are both fabricated from an aluminum alloy tubing having a diameter of about 3 inches and wall thickness of about ½ inch. Cam lock clamp assembly is fabricated from an aluminum alloy tubing having a diameter of about 3¾ inches and a wall thickness of about ⅜ inch. Flanges 55*a*, 55*b*, and 59 are preferably of a about ½ inch thick aluminum alloy. The total width from end-to-end of a presently preferred illustrative expander crossbrace 13 is about 92 to about 98 inches; the cam lock assembly 56 is about 18 inches in length; and, the range of slidable motion of port tube in cam lock assembly 56 is about 6 inches. Mounting brackets 20 for presently preferred crossbrace 13 have a U-shaped recess 70 and retainer lip 71 (FIGS. 11A–11B) for accepting and retaining the respective end mounting flanges 55*a*, 55*b* (FIG. 20). Mounting brackets 20 have mounting holes 72 and are fastened to ramp loader 10 using fasteners (e.g., through-bolts) that are inserted through holes 72 into and through corresponding holes in frame members 16.

Spacing of expander crossbraces 13 in different subassemblies 60–64 of ramp 10 is a matter of design choice for accommodating different maximum loads and CDPRS trailer configurations. In a presently preferred embodiment according to FIG. 6A–6D, mounting brackets 20 for expander crossbraces 13 are fastened to frame members 16 according to the following two general rules: namely, within 18 inches of the edge of any subassembly 60–63, and, optionally on about 30 inch centers within any subassembly 60–63. The illustrative preferred ramp 10 depicted in FIGS. 1–3 has structural integrity such that in prototype testing ramp 10 was capable of lifting, loading, aligning and inclining heavy cargo, e.g., a loaded GM™ Suburban™ and people having a combined weight in excess of 6000 pounds.

Lifting means for the subject ramp 10 is accomplished hydraulically by lifting cylinder 45 while the leveling and inclining functions are primarily accomplished by hydraulic cylinder 40 (FIG. 1–3). In operational mode, lifting cylinder 45 rests on a substrate, e.g., the ground, and is pivotally mounted on the forward portion of ramp 10 through mounting flange 18 (FIGS. 3 and 8). The forward portion of ramp 10 is retained against, e.g., the rear of, carrier 1 by pivoting roller bearing carriage assembly 24 (FIG. 8) which is inserted into and retained by guide track 48 (FIGS. 1–3.) Pressurizing hydraulic cylinder 45 raises the forward portion of ramp 10 and assembly 24 rises within track 48.

Leveling means for the subject ramp 10 is accomplished hydraulically by leveling cylinder 40 (FIGS. 1–3). In the representative embodiment depicted in FIGS. 1–3, one end of leveling cylinder 40 is rotatably fastened to the lower surface of ramp span bridge subassembly 62 (FIG. 6C) through mounting flange 19 (FIG. 1). In a presently preferred embodiment, the opposing end of leveling cylinder 40 is pivotally fastened to brace pad 34 that, in turn, rests upon the substrata (e.g., the ground). In this particular embodiment, brace pad 34 is supported and maintained in position by support brace 35 pivotally fastened to the base pad of lifting cylinder 45; and, support brace 30 pivotally fastened to mounting plate 2. In certain alternative embodiments, leveling cylinder 40 is pivotally fastened to the base of lifting cylinder 45 and a horizontal strut is extended to engage a wheel chock at the rear wheels of a carrier. Support braces 30,35 may be of a variety of sizes and shapes depending upon the desired load range of ramp 10 and weight of cargo to be lifted, leveled, loaded and unloaded. In the embodiment illustrated in FIGS. 1–3, braces 30 and 35 serve to support and maintain in position brace pad 34. In certain alternative embodiments, support braces 30, 35 are hydraulic cylinders. In other alternative embodiments, support braces 30, 35 are of an extendable crossbrace 13 design with a cam lock. In still other alternative embodiments, support braces 30, 35 are of a an entendable "twist lock" type.

In a presently preferred embodiment for heavy 8000 lb. vehicular cargo loads, leveling cylinder 40 (FIGS. 13A and 13B) is preferably a two stage 2½ inch hydraulic lift cylinder with a 60 inch stroke that is collapsible to about 38 inches. Leveling cylinder 45 preferably has a bore of about a 2½ inch with a 1 inch lifting rod having about a 100 inch stroke, operating at about 1600 psi with 3.5 gallons fluid required to retract and having about a 2 minute lift time at 2 gallons per minute. FIGS. 3 depicts the relationship of the ramp 10, its pivoting roller bearing assembly 24, and guide track 48 on the rear of an CDPRS cargo carrier 1 having cargo carrier track channel racking system 80, (below), where the track channel 15 is aligned with a cargo carrier track channel.) When aligned, spring 77-loaded track channel alignment sleeve 76 (FIG. 3) is capable of bridging any distance between the track channel of carrier 1 and the track channel of ramp loader 10.

Electrically powered hydraulic pumps are conveniently attached directly to lifting cylinder 45 and leveling cylinder 40 and power is provided by a loading dock plug, and a connection with a cargo vehicle power supply (e.g, in a tractor trailer or locomotive), with a generator set (Gen-set), e.g., transported on or in cargo carrier 1.

The guide track 48 for ramp 10 serves as an upwardly and downwardly movable connection between ramp 10 and cargo carrier 1. In alternative embodiments, guide track 48 is reversibly, or permanently, fastened to cargo carrier 1 through support brackets and plates such as those illustrated in FIGS. 1–3. Generally, the fastening means used for positioning of guide track 48 on carrier 1 will depend upon the location selected for deployment of ramp 10, e.g., side loading or rear loading.

The instant ramp loader lifts, levels, aligns, inclines, loads, and unloads and can be assembled and operated by a single operator so that vehicles or cargo weighing up to 8000 lb can be loaded into a carrier equipped with a track channel racking system. Embodiments of the invention provide a light-weight loading system made up of component parts each having a weight that an individual can assemble into a ramp in less than about ½ hour. The instant ramp loader is assemblable from individual inter-engaging subassembly panels 60,61,62 (each of which weighs less than about 75 lb.) that lock together through slide locks 14. In other objects, the invention provides a loader that is safely stowable inside a track channel, dolly, pallet and rack system cargo carrier 1, i.e, as subassembly panels 60–64 and/or the individual track channel frames 11,12 and expander crossbrace 13 subcomponents.

A further embodiment of the invention provides a ramp loader system and methods for allowing a single operator to move vehicles in and out of the cargo carrier onto a ramp loader and then onto the ground. The latter object is provided by the steps of: (i) assembling ramp loader 10 from its component subassemblies; (ii) placing a suitable number of tire track subassemblies onto the expander crossbraces at a distance appropriate for receiving the tires of the vehicle (e.g. a tire grate about 26 inches in width); (iii) engaging a channel-dolly-pallet assembly into the ramp track channel; (iv) driving the vehicle onto the ramp and then onto the channel-dolly-pallet assembly; (v) fastening the vehicle to the channel-dolly-pallet assembly; (vi) leveling the ramp loader by pressurizing leveling cylinder 40; and (vii) actuating ramp "dolly drive means" for a time sufficient to move the vehicle from the ramp into the carrier.

A final object of the invention is to provide an independent power supply for the lifting, leveling and loading system. This object is supplied by a gasoline powered electric generator (i.e., a Gen-Set, either portable or fastened to the carrier) or a source of electrical power (e.g., a loading dock plug, battery power supplied by a transporter such as a tractor trailer or locomotive). The subject power runs electric hydraulic pumps, rams, and winches. Control of the loading and unloading is conveniently maintained by an operator using a remote control module having e.g., three joysticks, the first to control the pressure in the lifting cylinder, the second to control the pressure in the leveling cylinder, and the third to control "left, right and both" according to the accompanying disclosure (below).

Embodiments of the invention provide a versatile ramp loader finding a variety of uses in loading cargo, and particularly vehicles, into carriers. Representative uses of the subject ramp loader include uses with channel-dolly-pallet-rack system cargo carrier as well as with drive-on/drive-off carriers. With drive-on/drive-off carriers a wide tire track assembly is substituted for the narrow track channel 15.

Figure 12:
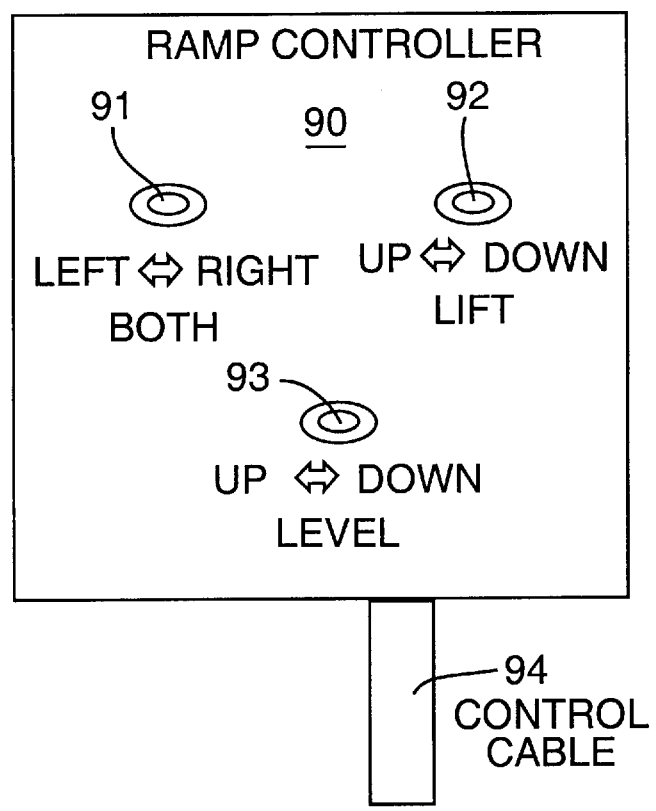
FIG. 12 depicts a controller for operating the hydraulic lifting and leveling cylinders of a track channel ramp loader to achieve lifting, leveling and aligning between ramp track channels and track channels in a carrier.

FIG. 12 depicts a controller for operating the hydraulic lifting and leveling cylinders of the track channel ramp loader to achieve lifting, leveling and aligning.

The controlling means includes a handheld ramp controller with three "joy sticks" each with a middle position and a left and a right position. A first joy stick 92 controls up and down movements of the ramp (i.e., pressure in the left and right lifting cylinders 45); a second joy stick 93 controls the leveling of the ramp (i.e., pressure in the left and right leveling cylinders 40; and the third joy stick 91 controls whether the "left", "right" or "both left and right" cylinders are pressurized or depressurized for lifting or for leveling. The control means has either a remote control cable 94 (FIG. 14) attached to a hydraulic valve control unit, or alternatively, the handheld unit may be equipped with a remote control radiowave transmitter sending signals to a transceiver at the hydraulic valve control unit. Control may be exerted logically (i.e., using a microprocessor and transmitter in the handheld unit to contact a transceiver and microprocessor at the valve control unit) or electrically (by using the handheld unit to control the supply of power to different circuits at the valve control unit.)

Figure 13:
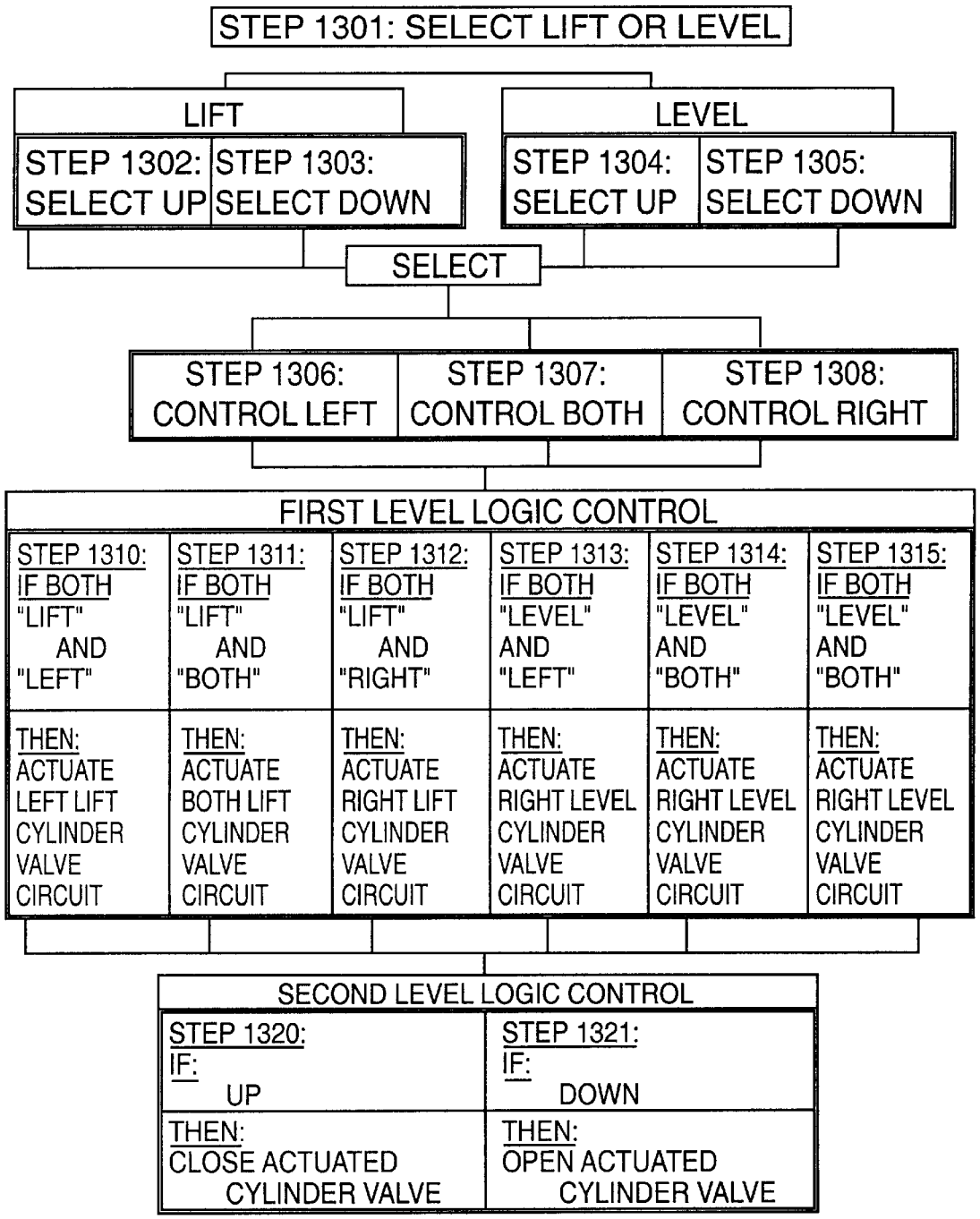
FIG. 13 depicts a process flow diagram for a control method for operating a track channel ramp loader to lift, level and align track channels on the ramp loader with a track channel system in a carrier.

FIG. 13 depicts a flow diagram for the control function lifting, leveling or aligning the track channel ramp loader 10 by operating the controller of FIG. 12 to pressurize or depressurize the left and right lifting and leveling hydraulic cylinders.

At step 1301 an operator selects activation of a lift or a level function key (e.g., either joy stick 92 or 93, respectively, FIG. 12). At steps 1302–1303, having selected a lift function key the operator selects an "up" or "down" mode. At steps 1304–1305, having selected a level function key the operator selects an "up" or a "down" mode. At steps 1306–1308 the operator makes a selection of whether the left side, the right side, or both sides of ramp loader 10 are to be affected by the operations of steps 1301–1305, above.

At steps 1310–1312, circuitry in the handheld remote controller determines whether to actuate the "lift" mode of left hydraulic cylinder 45 (step 1310; e.g., the left position of joy stick 91), both hydraulic cylinders 45 (step 1310; e.g., the center position of joy stick 91), or the right cylinder 45 (step 1311; e.g., the right position of joy stick 91).

At steps 1313–1315, circuitry in the handheld remote controller determines whether to actuate the "level" mode of left hydraulic cylinder 40 (step 1313; e.g., the left position of joy stick 91), both hydraulic cylinders 40 (step 1310; e.g., the center position of joy stick 91), or the right cylinder 40 (step 1311; e.g., the right position of joy stick 91).

At steps 1320 and 1321, circuitry in the handheld remote controller determines whether to direct pressurization (step 1302 or 1304; e.g., the left position of joystick 92 or 93, FIG. 12) or depressurization (step 1303 or 1305; e.g., the right position of joystick 92 or 93, FIG. 12) of one or more of the hydraulic cylinders selected in steps 1301–1315, above. Output from the circuits of the handheld remote controller is directed to the valve control unit controlling the hydraulic pumps and valve capable of pressurizing and depressurizing cylinders 40 and 45.

"Crawled" Tug

Figure 14A:
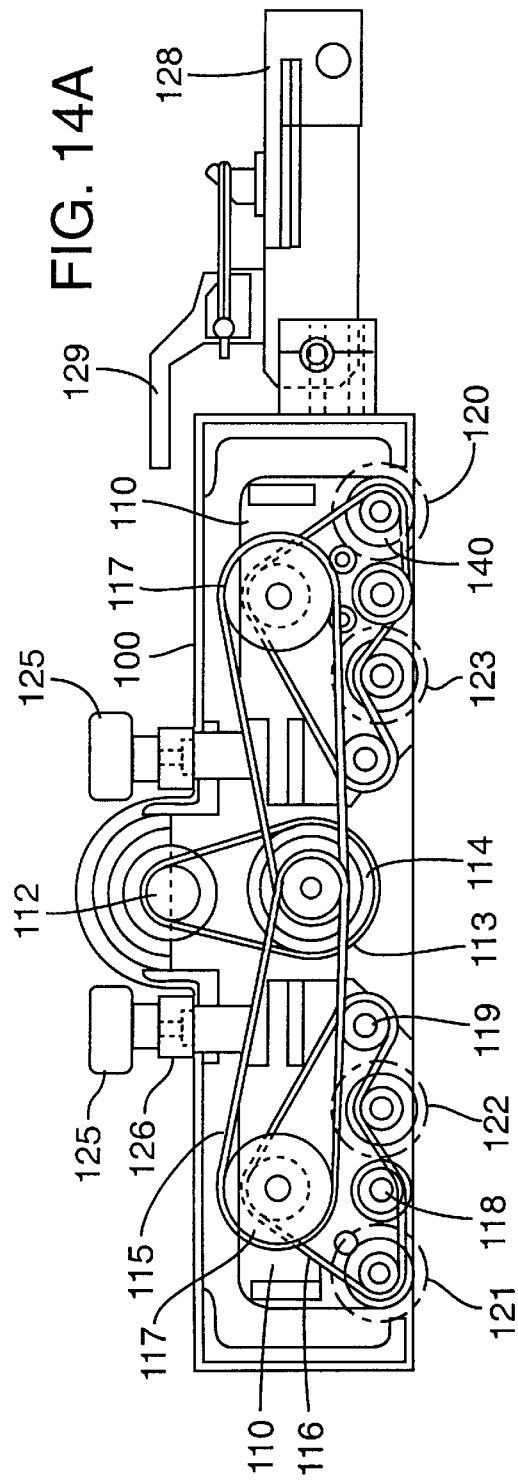
FIG. 14 depicts a cutaway portional side cross-sectional view (FIG. 14A) and plan view (FIG. 14B) of a hydraulic "crawler"-tug that engages track channels and is capable of loading and unloading heavy cargo from the ramp loader of FIGS. 1–4.
Figure 14B:
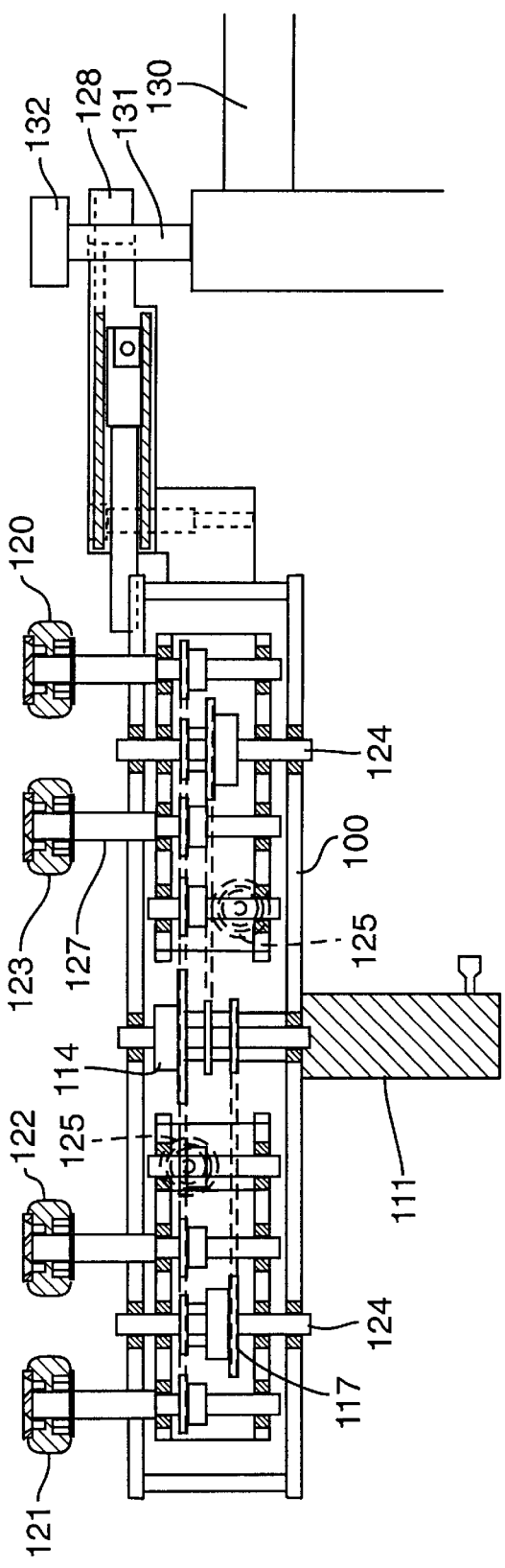

Embodiments of the invention provide a hydraulic "crawler"-tug, a cross-sectional side view of which is depicted in FIG. 14A with a plan view being depicted in FIG. 14B. The hydraulic "crawler"-tug has a housing 100 to which drive motor 111 is attached. The drive motor has a rotating drive shaft with a rotating motor drive sprocket 114 that has teeth capable of engaging drive chain 113. Drive chain 113 rotates and engages output sprocket 114 that is mounted on a shaft secured through bushings to housing 100. Output sprocket 114 has two reduction sprockets each engaging identical front and rear drive coupler chains 115. Drive coupler chains 115 engage identical front or rear carriage drive sprockets 117, (each sprocket 117 being mounted on a shaft 124 rotatably secured through bushings to housing 100). Shafts 124 serve as pivotal mounts for front and rear wheel carriage assemblies 110. Each of the front or rear wheel carriage assemblies has a rotatably mounted upper drive wheel 120 or 121 and a rotatably mounted lower drive wheel 122 or 123. In each of the front and the rear wheel carriages a drive chain 116 engages the respective carriage drive sprocket 117 and is fed in a loop over idler/tensioner sprockets 118 and 119 and wheel drive sprockets 140; with two wheel drive sprockets 140 being rotatably mounted on shafts 127 passing through bushings in each of the front and the rear wheel carriages 110 and extending laterally below housing 100 (FIG. 14B).

The upper 120,121 or lower 122,123 drive wheels of the crawler-tug are engaged inside the upper and lower surfaces of the track channel by pivoting the front and rear wheel carriages 110 on shaft 124. The wheel carriages are preferably pivoted by engaging the carriage tilt adjust thumb screws 125, drive wheels 120 and 121 engage the upper interior surface of a track channel and drive wheels 122 and 123 engage the lower interior surface of the track channels. Tilt adjustment thumb screws 125 control the pressure with which wheels 121–123 engage the upper and lower interior surfaces of track channel 15.

In a presently preferred embodiment, motor drive sprocket 112 has about 16 teeth, output sprocket 114 has about 32 teeth on its outer race (i.e., engaging drive chain 113) and 16 on each of its inner two races (i.e., each race engaging a front or a rear drive coupler chain 115). The outer race of carriage drive sprocket 117 has about 20 teeth and the inner race about 14 to 16 teeth. Each wheel drive sprocket 140 also has about 14 to 16 teeth.

Preferably the drive wheels are selected to have a diameter that allows easy insertion into track channel 15 (above). In one representative example, track channel 15 is a three inch channel. The crawler tug is fitted with wheels 120–123 having a diameter of about 2¾ inches. In operation, the crawler-tug wheels 120–123 are inserted into the end of track channel 15; thumb screw 125 is rotated to engage wheel carriage 110 thereby engaging upper 120,121 and lower 122,123 wheels in track channel 15; and thumb screw 12 is then locked into place with locking thumb nut 126. The position of thumb screw 125 determines the pressure with which wheels 120–123 engage the interior surface of track channel 15, and skilled artisans will of course recognize that the preferred pressure will vary according the loads that are being moved. In a first alternative embodiment, track channel 15 is fitted with one or more lateral loading gates that allow lateral insertion of wheels 120–123 into and out of track channel 15. In a second alternative embodiment, track channel 15 and frame 16 is a common extrusion having a lateral interior ramp opening that allows lateral insertion and removal of drive wheels 120–123.

Hydraulic "crawler"-tugs find a variety of uses in the methods of the invention, e.g., for moving cargo on pallets in a warehouses, on loading docks, on the instant ramp loaders, or into and out of carriers equipped with track channel rack systems. The "crawler" tug is capable of loading and unloading heavy cargo (e.g., 8000 lb.) along the subject track channel at a reasonable walking speed (i.e., at least about 1 foot per second). In a presently preferred embodiment this rate of movement is accomplished when hydraulic motor 112 is operating at a speed of less than about 50 to about 100 revolutions per minute.

Cargo Handling Methods

Embodiments of the invention provides rolling dolly pallets, track channel racking systems, a hydraulic track channel ramp for lifting, leveling and aligning cargo, and a hydraulic "crawler"-tug for loading the cargo in and out of the carrier. Aspects of the invention are of particularly use for loading and unloading vehicles and heavy cargo from carriers fitted with internal multilevel track racking systems. In addition to ease of loading by a single operator, other advantages provided by the instant invention include the ability to decrease damage to cargo during loading and shipping and ability to load carriers to greater capacity (i.e., on channel tracks) without crushing and damaging cargo.

FIG. 15 depicts a channel-dolly-pallet according to the methods of the invention having a frame 130 to which four axles 131 are mounted on which four wheels 132 are rotatably mounted.

Figure 16A:
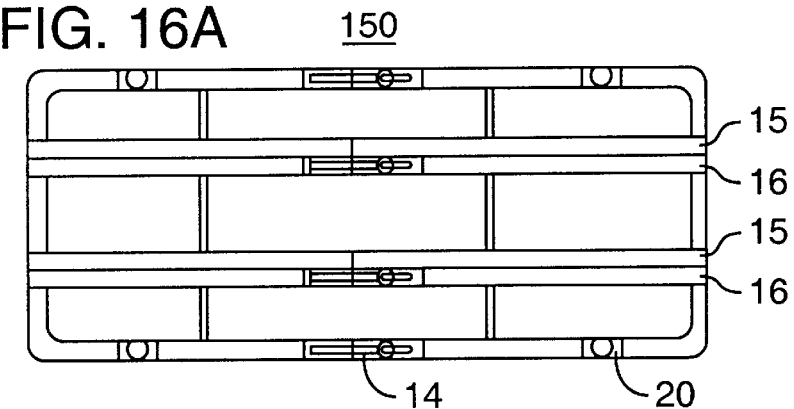
FIG. 16 schematically depicts a side view (FIG. 16A) and plan view (FIG. 16B) of a track channel racking system according to the methods of the invention useful in cargo carriers, warehouses and loading docks.

FIG. 16A depicts a side view of an illustrative racking unit subassembly 150 such as might be mounted against a side wall in a cargo carrier, e.g. a van trailer or rail car. Rack unit 150 has two subassembly panels joined together by slide lock assemblies 14, (in this case, one slide lock for each of the four channels making up the frame of the subassembly). Each of the subject rack unit subassemblies have a section of two track channels 15 with optional stiffening and strengthening frame members 16. Rack unit 150 also has cross brace mounting brackets 20 for receiving four expander crossbraces 13.

Figure 16B:
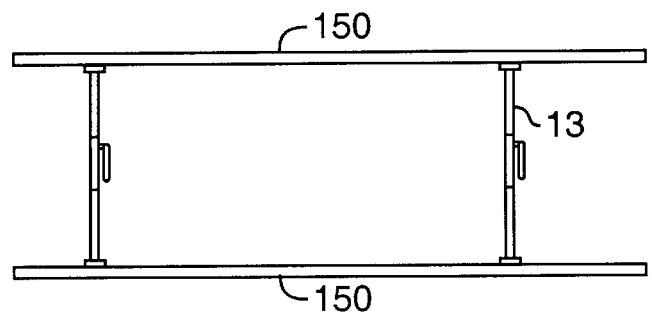

FIG. 16B depicts a plan view of an assembled racking unit such as might be found in a cargo carrier, rail car or in a warehouse (or loading dock) racking system. In this example, the assembly is made up of two of the racking unit 150 depicted in FIG. 16A separated and attached to one another by two expander crossbraces 13. The number and position of expander crossbraces 13 and track channels 15 will of course vary depending upon the load to be carried or stored on the racking unit. The assembled racking unit is useful in a warehouse conveyor-type track channel system according to the methods of the invention. In a preferred embodiment of the instant method, cargo is loaded onto a loading dock rack unit (FIG. 16B) using a wheeled embodiment of the instant track channel ramp loader, (i.e., depicted schematically in FIG. 17.) The racks units used for storing the cargo are preferably assembled to match the configuration of the racking units installed in a cargo carrier. Cargo may be rapidly transferred from a loading dock racking unit to the racking unit mounted in the cargo carrier by backing the cargo carrier up near the racking unit; connecting the racking unit on the dock to the racking unit in the cargo carrier using a track channel sleeve; mounting a crawler-tug (above) into position on the rail, and operating the crawler-tug to pull or push the cargo along the track into the cargo carrier.

Figure 17:
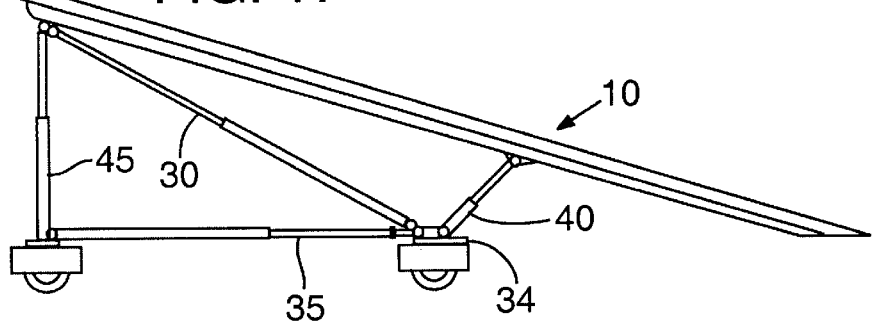
FIG. 17 depicts a warehouse rolling hydraulic ramp loader for lifting, leveling and aligning track channels of the ramp with those of a warehouse (or cargo carrier) track channel racking system.

FIG. 17 depicts a wheeled embodiment of the instant track channel ramp loader of the invention that is capable of lifting, leveling and aligning the track channels of the ramp with track channels in a cargo carrier or a loading dock racking system (e.g., according to FIG. 16A–16B, above). The subject wheeled embodiment has lifting cylinder 45, leveling cylinder 40, struts 30,35 and ramp 10 that are modified from those disclosed in FIGS. 1–4 (above) according to the different uses of this embodiment. Skilled mechanical engineers will, of course, recognize the altered stress and torsional forces placed upon the ramp loader and accept that within the spirit and scope of the invention a variety of different diagonal crossbraces may be added as needed (e.g., diagonal from the left front wheel to the right rear wheels; or, diagonal from the left front wheel to the right rear ramp mounting flange for hydraulic cylinder 40).

In a presently preferred method of use for the subject ramp loader, a dolly-pallet assembly is loaded into the track channels of the ramp loader and then a vehicular (or other) cargo is driven up (or moved onto) the ramp and onto the dolly-pallet. After fastening the tires of the vehicle (or cargo) to the ramp loader the loader is lifted, leveled and/or inclined and its track channels aligned with the track channels in the carrier. The cargo is then loaded from the track channel assembly of the ramp onto the track channel assembly of the carrier. The method is suitable for use with any cargo that can be loaded onto a dolly-pallet assembly, and is particularly useful with heavy (i.e., up to 6500 lb.) cargoes that are large and bulky (i.e., up to about 26 feet in length, up to about 7 feet in width, and up to about 9 feet in height).

While the preferred embodiment of the invention has been illustrated and described, it will be appreciated that skilled artisans will recognize various changes that can be made therein without departing from the spirit and scope of the invention.

What is claimed is:

1. A track channel ramp loader having means for lifting, leveling, aligning and inclining a first track channel frame affixed to said ramp loader with a second track channel frame on a carrier, wherein said carrier comprises a track channel rack and said track channel ramp loader comprises:
    a mounting means for pivotally attaching the track channel ramp loader to the carrier;
    a lifting hydraulic cylinder;
    a leveling hydraulic cylinder;
    a control means for controlling said lifting and leveling hydraulic cylinders;
    an extendible and expandable ramp comprising
        at least two track channel frame assemblies,
        at least two expander crossbraces each having a crossbrace lock assembly,
        a slide bridge subassembly having a means for attaching the mounting means and a means for pivotally mounting the lifting hydraulic cylinder,
        a first span bridge subassembly fastening and locking to the slide bridge and said first span bridge having a means for pivotally fastening the leveling hydraulic cylinder; and,
    wherein the lifting hydraulic cylinder is pivotally fastened to the slide bridge, the leveling hydraulic cylinder is pivotally fastened to the span bridge; said lifting comprises pressurizing the lifting hydraulic cylinder; said leveling comprises pressurizing the leveling hydraulic cylinder; said aligning and inclining comprise operating said control means to pressurize and depressurize the hydraulic lifting cylinder and the hydraulic leveling cylinder until the first track channel frame of the ramp loader is aligned with the second track channel frame of the carrier.

2. The ramp loader of claim 1 wherein said ramp is expandable from about 6 feet to about 9 feet and extendible from about 2 feet to about 26 feet in length.

3. The ramp loader of claim 2 wherein said ramp is capable of lifting and leveling a cargo having a weight of about 8000 lb.

4. The ramp loader of claim 1 wherein said first track channel frame has a track channel and a frame member.

5. The ramp loader of claim 1 wherein said track channel is formed from an aluminum alloy and has a wall thickness of about 3/16 inch to about 1/4 inch, a track channel width of about 2 inches and an internal track channel height of about 2 inches to about 3 inches.

6. The ramp loader of claim 1 wherein said frame member is formed from an aluminum alloy and has a wall thickness of about 1/4 inch to about 1/2 inch, a frame width of about 2 inches and a frame height of about 7 to about 10 inches.

7. The ramp loader of claim 1, wherein the two expander crossbraces each comprise a first and a second tube both of which are insertable into, slidably engaged, and lockable within a cam lock assembly.

8. The ramp loader of claim 1 wherein said hydraulic lifting cylinder has a bore of about 2 inches to about 3 inches and a stroke of about 100 inches.

9. The ramp loader of claim 1 wherein said hydraulic leveling cylinder comprises a two stage hydraulic lift cylinder with about a 56 inch stroke.

10. The ramp loader of claim 1 wherein said ramp has a length sufficient that when the slide bridge subassembly is mounted to the carrier and a lower ramp subassembly is in contact with a substrata an angle formed between the lower ramp subassembly and the substrata is about 8 degrees to about 11 degree.

11. The ramp loader of claim 10 further comprising said slide bride subassembly having a length of about 47 inches, said first span-bridge subassembly having a length of about 96 inches, a second span-bridge subassembly having a length of about 70 inches, and the lower ramp subassembly having a length of about 100 inches.

12. The ramp loader of claim 1, further comprising a tire grate assembly reversibly mounted on the expander crossbraces and capable of supporting a vehicle on the ramp.

\* \* \* \* \*